Dec. 1, 1964 E. C. DOWLING 3,159,813

BINARY COMPARATOR

Filed May 31, 1962

INVENTOR.
EDWARD C. DOWLING

BY

Curtis, Morris & Safford
ATTORNEYS

United States Patent Office 3,159,813
Patented Dec. 1, 1964

3,159,813

BINARY COMPARATOR

Edward C. Dowling, Harrisburg, Pa., assignor to AMP Incorporated, Harrisburg, Pa., a corporation of New Jersey Filed May 31, 1962, Ser. No. 198,949
5 Claims. (Cl. 340—146.2)

Figure 1:
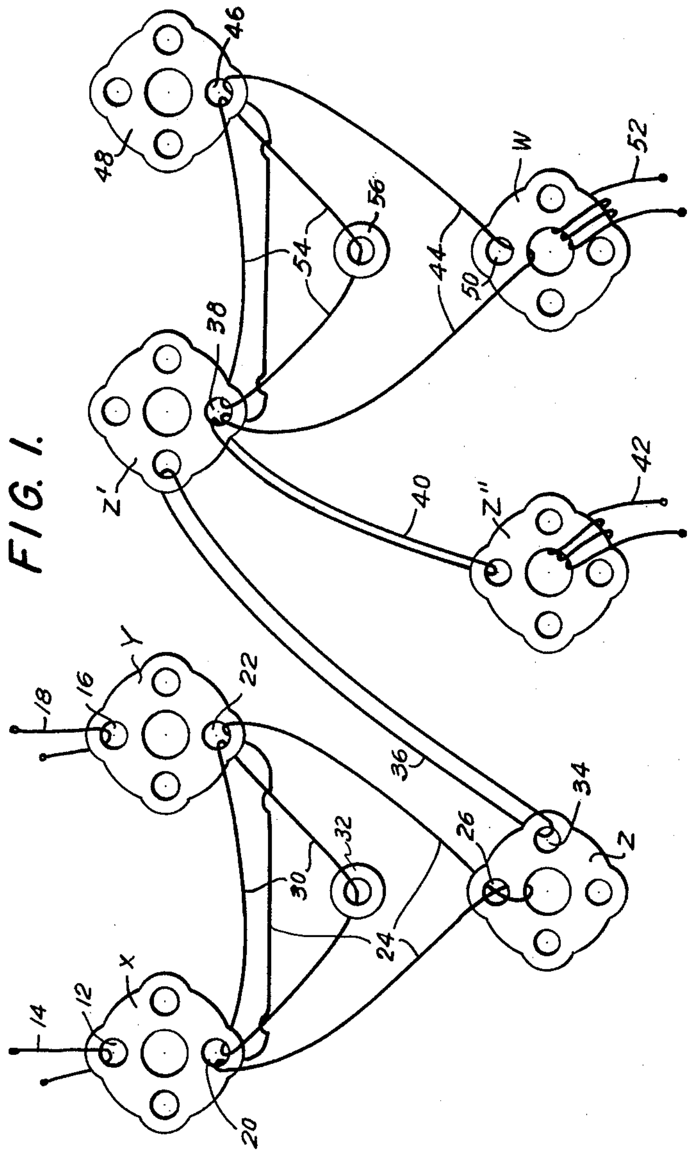

This invention relates to an electric device for comparing one binary digit with another, more particularly the invention relates to a magnetic core circuit for this purpose.

An object of the invention is to provide a binary comparator which is highly reliable and efficient and which is compatible with certain existing equipment.

Another object is to provide an improved arrangement of this kind which uses magnetic cores and connecting wires only as the circuit elements.

A further object is to provide such a circuit which is simple and inexpensive to manufacture and which operates properly over a wide range of temperature and drive currents.

These and other objects will in part be understood from and in part pointed out in the description given hereinafter.

In U.S. Patent 2,995,731 there is described a shift register using multi-aperture magnetic cores (MAD's) and connecting wire only as the circuit elements. The cores are divided into odd and even groups and by proper application to the cores of prime, advance-odd and advance-even drive currents, binary information is shifted down the register from one core to the next. A shift register of this kind is able to operate reliably over a wide temperature range (for example, 0° C. to 55° C.) and is virtually immune to failure because of aging of parts, etc. Accordingly, these devices are extremely valuable particularly in difficult applications such as missile systems and the like. Because of the success of these shift registers, there is now, more than ever, a need for a binary comparator which is compatible with such equipment and which also has its outstanding reliability, range of operation, and economy. The present invention provides such a comparator.

Viewed in the abstract, the operation of a binary comparator is straightforward. The circuit looks at two binary signal inputs, and when a signal occurs at both, or when no signal occurs at either, during a given time interval, the circuit produces an output signal to indicate that the two signals, whether a binary one or zero, were identical. Usually also it is desirable for the circuit to be able to give a "non-compare" output signal when the binary signals are different.

Previously the design and building of such a circuit had not been a simple matter, particularly in the more general case where the two input signals to be compared do not necessarily occur simultaneously. The present invention overcomes the deficiencies of prior devices and provides an easily built circuit arrangement using magnetic cores (MAD's) and connecting wire only.

In accordance with the present invention two MAD cores (which will be designated X and Y, respectively) are connected to receive separate input signals, either a binary one or a zero. An output minor aperture of each core is connected to a common "exclusive-OR" coupling winding which threads two minor input portions of a third MAD core (designated Z). An output minor aperture of the latter core is coupled to a similar MAD core (Z′), the output of which is connected to another MAD core (Z″), which serves to give an output signal when the two input signals do not compare. The signal from the Z′ core is also coupled, by a negating coupling arrangement, to still another MAD core (designated W). When the two input signals applied to cores X and Y do compare during a given interval, core W will thereafter produce an output signal to indicate the fact. This arrangement of cores and coupling loops gives a comparator which can be energized by the same drive current pulses as those used to drive the shift register mentioned above. Moreover, this comparator has substantially the same reliability and wide range of operation as such a shift register.

Figure 2:
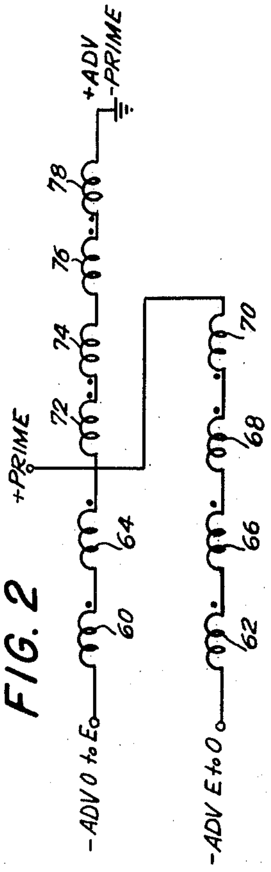

A better understanding of the invention together with a fuller appreciation of its many advantages will best be gained from the following description given in connection with the accompanying drawings wherein:

FIGURE 1 is a schematic circuit of a binary comparator embodying the invention, the drive windings for the magnetic cores not being shown here, and FIGURE 2 shows the respective drive windings for the cores.

The binary comparator 10 in FIGURE 1 comprises a first input MAD core X and a second input MAD core Y. Core X has an input minor aperture 12 which is threaded by an input winding 14. A first input signal pulse of current is applied to this winding in direction and amplitude such that the outer leg of the core at aperture 12 will be saturated with flux in the counter-clockwise direction. When such a pulse occurs, the core will be set with a binary one. In the absence of an input pulse, the core will be set with a binary zero. Similarly, core Y has an input minor aperture 16 threaded by an input winding 18. A separate input signal pulse applied to this winding will set a binary one into core Y.

Core X has an output minor aperture 20 and core Y, an output minor aperture 22. These are threaded in the respective senses shown by an "exclusive-OR" coupling winding 24. The latter also threads, in "figure-eight" configuration an input minor aperture 26 of core Z. Now, when either core X or core Y, but not both, transmits a binary one, core Z will be set with a one. This condition occurs only when the two input signals to cores X and Y were different (i.e. one signal was a binary one, and the other a binary zero). It will be noted that output apertures 20 and 22 are also threaded, in the respective senses shown by a compensating winding 30. This winding drives an auxiliary magnetic core 32 (shown as a simple torroid). The core and winding provide a dummy load to cancel the effect on coupling winding 24 of prime drive currents passing through apertures 20 and 22, as is explained in U.S. application Serial Number 178,372.

Core Z has an output minor aperture 34 which is threaded by a coupling winding 36. This winding drives an intermediate core Z′; whenever core Z is set with a one, core Z′ will on the next clock cycle also be set with a one. Core Z′ will receive a binary one only when the previous input signals to cores X and Y do not compare.

Core Z′ has an output aperture 38 which is threaded by a coupling winding 40. This winding supplies an input signal to a core Z″, the latter providing an output signal to a winding 42 only when a binary one is transmitted from core Z′. Output aperture 38 of core Z′ is also threaded by a second coupling winding 44 which also threads an output minor aperture 46 of an auxiliary MAD core 48, and an input minor aperture 50 of an output core W. Winding 44 in conjunction with core 48, which on each clock cycle is set with a binary one, serves to negate or complement the output signal from core Z′, whether a one or a zero. Thus, if core Z′ transmits a one, core W will be set with a zero, and if core Z′ transmits a zero, core W will be set with a one. Core W has an output winding 52 in which a voltage is induced whenever the core receives a binary one. Thus, a signal in this winding indicates that the previous inputs to cores X and Y were the same, whether ones or zeros.

Coupling winding 44 is similar to "exclusive-OR" winding 24, and to compensate for priming current through apertures 38 and 46, a compensating winding 54 is threaded through these apertures and connected to drive an auxiliary magnetic core 56.

FIGURE 2 shows the various drive windings which thread respective ones of the cores of FIGURE 1. Cores X, Y, Z', and 48 are cleared to zero state, i.e. saturated with flux in the clockwise direction, each advance O to E cycle by means of a current pulse applied to a winding 60 threading the major apertures of these cores. Similarly, cores Z, Z'' and W are cleared on each advance E to O cycle by a current pulse applied to a winding 62 threading their major apertures. A winding 64 in series with winding 60, and which threads the major apertures of cores Z, Z'' and W applies current drive to them during the advance O to E drive. Similarly, a winding 66, threading the major apertures of cores X, Z' and 48 applies current drive to them during the advance E to O drive. A winding 68 threading auxiliary cores 32 and 56 applies current drive to clear them during advance E to O drive. Finally, a winding 70 threading an input minor aperture of core 48 sets it with a binary one during each advance E to O drive.

The output minor apertures 20 and 22 of cores X and Y and the output minor apertures 38 and 46 of cores Z' and 48 are primed by a winding 72. For the sake of simplicity, a direct current is assumed to be applied to this and the other prime windings. The major apertures of cores X, Y, Z' and 48 are threaded by a reverse prime winding 74.

Minor aperture 34 of core Z is primed by a winding 76, and the major apertures of cores Z, Z'' and W are threaded in reverse direction by a prime winding 78. Prime windings 72, 74, 76 and 78 are connected as a common leg to ground in series with the advance windings.

The voltage outputs on winding 42 of core Z'' or on winding 52 of core W are obtained during setting of these cores, i.e. during the advance O to E clock cycle. If desired, additional output windings threading minor output apertures, respectively, of cores Z'' and W can be added to obtain output signals on the advance E to O cycle.

The above description is intended in illustration and not in limitation of the invention. Various changes in the embodiments described may occur to those skilled in the art and these may be made without departing from the spirit or scope of the invention as set forth.

I claim:

1. A magnetic core binary comparator comprising a first and a second MAD core adapted to receive separate input signals during a clock cycle, a third MAD core means, an exclusive-OR coupling winding threading an output minor aperture of said first core, an output minor aperture of said second core and a pair of input minor aperture portions of said third core means, means to derive a first output signal from said third core means to indicate a non-compare condition and to derive a second output signal from said third core means to indicate a compare condition, and means to supply said cores with drive currents.

2. The comparator in claim 1 wherein said means to derive one of said output signals includes a fourth MAD core which continually transmits a binary one, an output magnetic core, and a semi-exclusive-OR coupling winding threading an output minor aperture of said third core means, threading an output minor aperture of said fourth core and threading said output core.

3. The comparator in claim 2 in further combination with dummy load means in parallel with said coupling windings.

4. A magnetic core binary comparator comprising a first and a second MAD core having inputs adapted to receive separate input signals to be compared, a third MAD core, a first coupling winding threading in opposite senses an output minor aperture of said first core and an output minor aperture of said second core and threading in opposite senses a pair of input minor aperture portions of said third core, a fourth MAD core which continually transmits a binary one, a first output magnetic core, a second coupling winding which threads in opposite senses an output minor aperture of said third core, an output minor aperture of said fourth core and said first output core, advance O to E drive means threading the major apertures of said first and second cores and threading said fourth core to set a one therein, advance E to O drive means threading the major apertures of said third and fourth cores, and prime drive means threading said output minor apertures.

5. A comparator as in claim 4 in further combination with a second output magnetic core coupled to said third core.

No references cited.